A. C. Lewis,
Protecting Melting Pots.
No. 113,312. Patented Apr. 4, 1871.
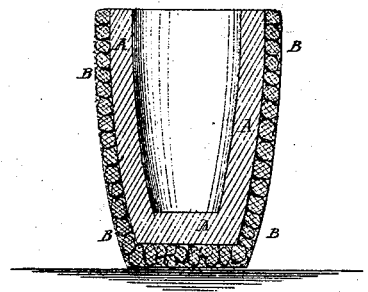
Witnesses:
A. W. Almquist
Wm. H. C. Smith.
Inventor:
A. C. Lewis
per Munn & Co.
Attorneys.

United States Patent Office.

ALBERT C. LEWIS, OF NEW YORK, N. Y., ASSIGNOR TO HIMSELF, H. A. RICHARDSON, AND N. A. BOYNTON, OF SAME PLACE.

Letters Patent No. 113,312, dated April 4, 1871.

---

IMPROVEMENT IN COVERINGS FOR MELTING-POTS.

The Schedule referred to in these Letters Patent and making part of the same.

---

*To all whom it may concern:*

Be it known that I, ALBERT C. LEWIS, of New York city, in the county and State of New York, have invented a new and useful Improvement in Covering for Melting-Pots; and I do hereby declare that the following is a full, clear, and exact description thereof, which will enable others skilled in the art to make and use the same, reference being had to the accompanying drawing forming part of this specification.

The figure is a vertical section of a melting-pot covered with my improved covering.

My invention has for its object to furnish an improved covering for melting-pots, to protect them from being injured by the intense heat, and by the adhesion of the coals; and It consists in a covering of asbestus wound or braided about the melting-pot, as hereinafter more fully described.

A represents a melting-pot or crucible made of plumbago in the ordinary manner. As commonly used, the pot A, before being put into the fire, is covered with a coating of clay. This clay coating usually cracks and partially drops off, so that the coals have access to and adhere to the outer surface of the pot, from which they cannot be removed without injuring or spoiling the pot.

To prevent this I cover the pot with a covering, B, of asbestus. The asbestus is crushed or pounded to reduce it to a fibrous mass, leaving the fibers as long as possible. The fibrous asbestus is then twisted or braided into a cord or rope, which is then wound or braided around the bottom and sides of the pot A, so that its outer surface may be entirely covered; or, the asbestus may be braided upon the melting-pot A in the manner of basket-work.

It is entirely immaterial in what manner the asbestus is applied to the pot, provided its entire outer surface be covered so that the coals cannot come in contact with the surface of the pot.

When the pot, thus covered, is to be used, it may be covered with a light coating of clay, which may come off with the coals that may adhere to it.

This asbestus covering, being unaffected by fire or heat, will effectually guard the pot from injury, no matter how intense may be the heat to which it may be exposed.

Having thus described my invention,

I claim as new and desire to secure by Letters Patent—

An improved covering for melting-pots or crucibles, formed of asbestus, twisted, wound, or braided around and upon said pot, so as to cover its entire outer surface, substantially as herein shown and described, and for the purpose set forth.

The above specification of my invention signed by me this 18th day of January, 1871.

ALBERT C. LEWIS.

Witnesses:
  JAMES T. GRAHAM,
  GEO. W. MABEE.